United States Patent
Suzuki

(10) Patent No.: US 7,518,639 B2
(45) Date of Patent: Apr. 14, 2009

(54) ELECTRONIC STILL CAMERA THAT PROVIDES A STORABLE CONTINUOUS FRAME COUNT AND A CONTINUOUS SHOOTING RATE OF FRAMES

(75) Inventor: Masahiro Suzuki, Inzai (JP)

(73) Assignee: Nikon Corporation, Tokyo (JP)

( * ) Notice: Subject to any disclaimer, the term of this patent is extended or adjusted under 35 U.S.C. 154(b) by 603 days.

(21) Appl. No.: 10/872,458

(22) Filed: Jun. 22, 2004

(65) Prior Publication Data

US 2005/0001911 A1 Jan. 6, 2005

(30) Foreign Application Priority Data

Jul. 1, 2003 (JP) .............................. 2003-189577

(51) Int. Cl.
*H04N 5/76* (2006.01)
*G03B 17/24* (2006.01)

(52) U.S. Cl. .................................. 348/231.1; 396/321
(58) Field of Classification Search ............ 348/231.99, 348/231.1, 231.2, 231.3; 396/321
See application file for complete search history.

(56) References Cited

U.S. PATENT DOCUMENTS

| | | | | |
|---|---|---|---|---|
| 5,018,017 A | * | 5/1991 | Sasaki et al. ............. | 348/231.1 |
| 5,293,236 A | * | 3/1994 | Adachi et al. ............. | 348/231.2 |
| 5,434,618 A | * | 7/1995 | Hayashi et al. ........... | 348/231.2 |
| 5,633,976 A | * | 5/1997 | Ogino ...................... | 348/231.1 |
| 5,764,800 A | | 6/1998 | Yamagata | |
| 5,852,467 A | * | 12/1998 | Ogino ...................... | 348/231.1 |
| 6,449,426 B1 | * | 9/2002 | Suga et al. ................. | 386/117 |
| 6,862,106 B1 | * | 3/2005 | Matsushima ............. | 348/231.1 |
| 2002/0031349 A1 | | 3/2002 | Hayashi | |
| 2006/0152599 A1 | * | 7/2006 | Yokonuma et al. ...... | 348/231.99 |
| 2008/0151076 A1 | * | 6/2008 | Takane ................... | 348/231.99 |
| 2008/0158389 A1 | * | 7/2008 | Jeong ...................... | 348/231.7 |

FOREIGN PATENT DOCUMENTS

| | | | |
|---|---|---|---|
| JP | 06350907 A | * | 12/1994 |
| JP | A 2001-169227 | | 6/2001 |
| JP | A-2002-300450 | | 10/2002 |
| JP | 2003023556 A | * | 1/2003 |

* cited by examiner

*Primary Examiner*—John M Villecco
(74) *Attorney, Agent, or Firm*—Oliff & Berridge, PLC

(57) ABSTRACT

The electronic still camera includes an internal memory, a calculating part, a storage medium, and a display part. With a storing rate of the storage medium equal to or higher than an internal processing rate of the camera, the calculating part calculates a storable continuous frame count according to a residual storage capacity and an image data amount of the storage medium. With the storing rate lower than the internal processing rate, it calculates the same according to a storage capacity of the internal memory, the image data amount, a continuous shooting rate of frames, the internal processing rate, and the storing rate, and calculates the continuous shooting rate of frames of when an actual continuous frame count exceeds the storable continuous frame count according to the storing rate and image data amount. The display part displays the storable continuous frame count and continuous shooting rate of frames.

6 Claims, 4 Drawing Sheets

ELECTRONIC STILL CAMERA THAT PROVIDES A STORABLE CONTINUOUS FRAME COUNT AND A CONTINUOUS SHOOTING RATE OF FRAMES

CROSS REFERENCE TO RELATED APPLICATION

This application is based upon and claims the benefit of priority from Japanese Patent Application No. 2003-189577, filed on Jul. 1, 2003, the entire contents of which are incorporated herein by reference.

BACKGROUND OF THE INVENTION

1. Field of the Invention

The present invention relates to an electronic still camera and an electronic still camera system, in particular, to ones that provide, in accordance with a storing rate of a storage medium, a storable continuous frame count and a continuous shooting rate of frames at a time when an actual continuous frame count exceeds the storable continuous frame count.

2. Description of the Related Art

At continuous shooting by use of a conventional electronic still camera, image data of a shot object is temporarily stored in an internal memory and then is stored in a storage medium that is composed of semiconductor memories such as a compact flash memory, to finish the continuous shooting.

In this case, although the camera has a predetermined internal processing rate, the storing rate of the storage medium differs according to manufacturers or products so that the continuous shooting performance of the electronic still camera depends on the storing rate of a storage medium that the electronic still camera uses. When a storage medium whose storing rate is lower than the internal processing rate of the electronic still camera, the storable continuous frame count is limited by the storing rate of the storage medium.

Meanwhile, there has been a high request from users to know accurate continuous shooting performance of the electronic still camera. In response to their request, the conventional electronic still memory determines the upper limit of the storable continuous frame count in the continuous shooting mode in accordance with the capacity of internal memories. Alternatively, it lowers the continuous shooting rate of frames instead of determining the upper limit of the storable continuous frame count when frames are continuously shot beyond the capacity of the internal memory.

Japanese Unexamined Patent Application Publication No. 2001-169227 discloses a technique for reading the storing rate of a storage medium to display a residual shooting time in data recording apparatus that stores moving images and so forth.

With the above-described technique, the users can know in advance the storable continuous frame count in the continuous shooting mode if the upper limit of the storable continuous frame count is determined in accordance with the capacity of the internal memory. In recent years, however, there are storage media that have a plurality of internal buffers and has a storing rate higher than an internal processing rate of an electronic still camera. If such a storage medium is used with an electronic camera, it is not possible to increase the storable continuous frame count because of the lower storing rate of the camera. As a result, the user cannot fully take advantage of the features of the storage medium, and on that point conventional cameras have to be modified.

On the other hand, it is possible to increase the storable continuous frame count by use of the storage medium with a higher storing rate, if the upper limit of the storable continuous frame count is not set. However, in this case, the user cannot know of how many continuous frames are stored; therefore, the storage medium cannot meet the users' needs sufficiently. Besides, the user may not obtain desired images if he or she uses a storage medium with a lower storing rate because the user cannot know the continuous shooting rate of frames of when an actual continuous frame count exceeds the storable continuous frame count.

Furthermore, according to the technique disclosed in the above-mentioned Publication No. 2001-169227, the user cannot obtain accurate information on residual storage time and so forth at initial shooting or setting changes of the electronic still camera because the information is obtained according to the storing rate at which previous moving images were shot. Also, the technique has been developed on the precondition that the storing rate of the storage medium is to be equal to or lower than the internal processing rate of the electronic still camera. Moreover, it cannot solve the problems unique to the electronic still camera such as a decrease of the continuous shooting rate of frames of when an actual continuous frame count exceeds the storable continuous frame count.

SUMMARY OF THE INVENTION

In view of solving the foregoing problems of the above-mentioned prior art technique, an object of the present invention is to provide an electronic still camera that allows the user to accurately know, before shooting, a storable continuous frame count of an electronic still camera and a continuous shooting rate of frames of when an actual continuous frame count exceeds the storable continuous frame count.

The present invention will be described in the following.

According to a first aspect of the present invention, an electronic still camera has an image pickup device, an internal memory, a calculating part, a storage medium, and a display part. The storage medium is attachable to the electronic still camera and stores therein image data obtained from the image pickup device through the internal memory.

The calculating part includes: a storage information reading part which reads a storing rate and a residual storage capacity of the storage medium; a comparison part which compares an internal processing rate of the electronic still camera and the storing rate of the storage medium; and a frame count calculating part which calculates a storable continuous frame count corresponding to a designated continuous shooting rate of frames and an image data amount, and a continuous shooting rate of frames of when an actual continuous frame count exceeds the storable continuous frame count.

When the storing rate is equal to or higher than the internal processing rate, the frame count calculating part calculates the storable continuous frame count in accordance with the residual storage capacity of the storage medium and the image data amount. When the storing rate is lower than the internal processing rate, the frame count calculating part calculates the storable continuous frame count in accordance with the storage capacity of the internal memory, the image data amount, the continuous shooting rate of frames, the internal processing rate, and the storing rate, and calculates, in accordance with the storing rate and the image data amount, the continuous shooting rate of frames of when an actual continuous frame count exceeds the continuous frame count.

The display part displays at least one of the storable continuous frame count and the continuous shooting rate of frames of when an actual continuous frame count exceeds the storable continuous frame count.

When the storing rate is lower than the internal processing rate, it is preferable that the frame count calculating part of the first aspect of the present invention should calculate the continuous shooting rate of frames of when an actual continuous frame count exceeds the storable continuous frame count, according to the following formula (3).

Continuous shooting rate of frames of when an actual
   continuous frame count exceeds storable continu-
   ous frame count=storing rate of storage medium/
   image data amount     (3)

Also, It is preferable that the storage information reading part of the first aspect of the present invention should read the storing rate at least when the electronic still camera is powered on or when the storage medium is attached to the electronic still camera.

According to a second aspect of the present invention, an electronic still camera system includes: an electronic still camera having an image pickup device, an internal memory, and a calculating part; and an outboard storage being connected with the electronic still camera via a communication line, in which at least one of the electronic still camera and the outboard storage has a display part.

The calculating part includes: an outboard storage information reading part which reads a data transfer rate and a residual storage capacity of the outboard storage; a comparison part which compares an internal processing rate of the electronic still camera and the data transfer rate of the outboard storage; and a frame count calculating part which calculates a storable continuous frame count corresponding to a designated continuous shooting rate of frames and an image data amount, and a continuous shooting rate of frames of when an actual continuous frame count exceeds the storable continuous frame count.

When the data transfer rate is equal to or higher than the internal processing rate, the frame count calculating part calculates the storable continuous frame count in accordance with the residual storage capacity of the outboard storage and the image data amount. When the data transfer rate is lower than the internal processing rate, the frame count calculating part calculates the storable continuous frame count in accordance with a storage capacity of the internal memory, the image data amount, the continuous shooting rate of frames, the internal processing rate, and the data transfer rate, to calculate the continuous shooting rate of frames of when an actual continuous frame count exceeds the storable continuous frame count, in accordance with the data transfer rate and the image data amount.

The display part displays at least one of the storable continuous frame count and the continuous shooting rate of frames of when an actual continuous frame count exceeds the storable continuous frame count.

When the data transfer rate is lower than the internal processing rate, it is preferable that the frame count calculating part of the second aspect of the present invention should calculate the continuous shooting rate of frames of when an actual continuous frame count exceeds the storable continuous frame count, according to the following formula (6).

Continuous shooting rate of frames of when an actual
   continuous frame count exceeds storable continu-
   ous frame count=data transfer rate of outboard
   storage/image data amount     (6)

It is also preferable that the storage information reading part of the second aspect of the present invention should read the data transfer rate when necessary in response to a variation in a communication environment between the electronic still camera and the outboard storage.

According to a third aspect of the present invention, a program is for an electronic still camera including an image pickup device, an internal memory, a calculating part, and a storage medium. The program of the electronic still camera causes the calculating part to execute the steps of: reading a storing rate and a residual storage capacity of the storage medium; comparing an internal processing rate of the electronic still camera and the storing rate of the storage medium; calculating a storable continuous frame count in accordance with the residual storage capacity of the storage medium and a designated image data amount when the storing rate is equal to or higher than the internal processing rate; calculating the storable continuous frame count in accordance with a storage capacity of the internal memory, the image data amount, a designated continuous shooting rate of frames, the internal processing rate, and the storing rate of the storage medium, and calculating the continuous shooting rate of frames of when an actual continuous frame count exceeds the continuous frame count, in accordance with the storing rate and the image data amount, when the storing rate of the storage medium is lower than the internal processing rate.

According to a fourth aspect of the present invention, a program is for an electronic still camera system including an electronic still camera and an outboard storage. The electronic still camera has an image pickup device, an internal memory, and a calculating part, and the outboard storage is connected with the electronic still camera via a communication line.

The program for the electronic still camera system causes the calculating part to execute the steps of: reading a data transfer rate and a residual storage capacity of the outboard storage; comparing an internal processing rate of the electronic still camera and the data transfer rate of the outboard storage; calculating the storable continuous frame count in accordance with a residual storage capacity of the outboard storage and a designated image data amount when the data transfer rate is equal to or higher than the internal processing rate; calculating the storable continuous frame count in accordance with a storage capacity of the internal memory, the image data amount, a designated continuous shooting rate of frames, the internal processing rate, and the data transfer rate and calculating the continuous shooting rate of frames of when an actual continuous frame count exceeds the storable continuous frame count in accordance with the data transfer rate and the image data amount, when the data transfer rate is lower than the internal processing rate.

According to a fifth aspect of the present invention, an electronic still camera has an image pickup device, a calculating part, a storage medium, and a display part. The storage medium is attachable to the electronic still camera and stores therein image data obtained from the image pickup device.

The calculating part includes: a storage information reading part which reads a storing rate and a residual storage capacity of the storage medium; a comparison part which compares an internal processing rate of the electronic still camera and the storing rate of the storage medium; and a frame count calculating part which calculates a storable continuous frame count by dividing the residual storage capacity by image data amount per frame, when the storing rate is equal to or higher than the internal processing rate. The storable continuous frame count is displayed on the display part.

According to a sixth aspect of the present invention, an electronic still camera includes an image pickup device; an internal memory which temporarily stores an image generated by the image pickup device; a storage medium which stores therein image data obtained by signal-processing the image; a calculating part which obtains a maximum number of images that can be stored in the internal memory and an amount of image data that can be stored in the storage medium until the number of images stored in the internal memory reaches the maximum number of images, and adds the maximum number of images and the amount of image data so as to calculate a storable continuous frame count; and a display part which displays the storable continuous frame count.

According to a seventh aspect of the present invention, an electronic still camera system includes an electronic still camera and an outboard storage. The electronic still camera has an image pickup device and a calculating part. The outboard storage is connected with the electronic still camera via a communication line. At least one of the electronic still camera and the outboard storage has a display part.

The calculating part includes: an outboard storage information reading part which reads a data transfer rate and a residual storage capacity of the outboard storage; a comparison part which compares an internal processing rate of the electronic still camera and the data transfer rate of the outboard storage; and a frame count calculating part which calculates a storable continuous frame count by dividing the residual storage capacity by an image data amount per frame when the data transfer rate is equal to or higher than the internal processing rate. The display part displays the storable continuous frame count.

According to an eighth aspect of the present invention, an electronic still camera system includes an electronic still camera and an outboard storage. The electronic still camera has an image pickup device, an internal memory temporarily storing therein an image generated by the image pickup device, and a calculating part. The outboard storage is connected with the electronic still camera via a communication line to store therein image data obtained by signal-processing the image. At least one of the electronic still camera and the outboard storage has a display part.

The calculating part obtains a maximum number of images that can be stored in the internal memory, and an amount of image data that can be stored in the outboard storage until a number of images stored in the internal memory reaches the maximum number, and adds the maximum number and the amount of image data so as to calculate a storable continuous frame count. The display part displays the storable continuous frame count.

According to a ninth aspect of the present invention, a program is for an electronic still camera having an image pickup device, a calculating part, and a storage medium. The program of the electronic still camera causes the calculating part to execute the steps of: reading a storing rate and a residual storage capacity of the storage medium; comparing an internal processing rate of the electronic still camera and the storing rate of the storage medium; and calculating a storable continuous frame count by dividing the residual storage capacity by an image data amount per frame when the storing rate is equal to or higher than the internal processing rate.

According to a tenth aspect of the present invention, a program is for an electronic still camera having an image pickup device, an internal memory temporarily storing therein an image generated by the image pickup device, a storage medium storing therein image data obtained by signal-processing the image, and a calculating part.

The program for the electronic still camera causes the calculating part to execute the steps of: obtaining a maximum number of images that can be stored in the internal memory, and an amount of image data that can be stored in the storage medium until a number of images stored in the internal memory reaches the maximum number; and adding the maximum number of images and the amount of image data so as to calculate a storable continuous frame count.

According to an eleventh aspect of the present invention, a program is for an electronic still camera system having an electronic still camera and an outboard storage. The electronic still camera has an image pickup device and a calculating part. The outboard storage is connected with the electronic still camera via a communication line.

The program for the electronic still camera system causes the calculating part to execute the steps of: reading a data transfer rate and a residual storage capacity of the outboard storage; comparing an internal processing rate of the electronic still camera and the data transfer rate of the outboard storage; and calculating a storable continuous frame count by dividing the residual storage capacity by an image data amount per frame when the data transfer rate is equal to or higher than the internal processing rate.

According to a twelfth aspect of the present invention, a program is for an electronic still camera system having an electronic still camera and an outboard storage. The electronic still camera has an image pickup device, an internal memory temporarily storing therein an image generated by the image pickup device, and a calculating part. The outboard storage is connected with the electronic still camera via a communication line and stores therein image data obtained by signal-processing the image.

The program for the electronic still camera system causes the calculating part to execute the steps of: obtaining a maximum number of images that can be stored in the internal memory, and an amount of the image data that can be stored in the outboard storage until a number of images stored in the internal memory reaches the maximum number; and adding the maximum number of images and the amount of image data so as to calculate a storable continuous frame count.

BRIEF DESCRIPTION OF DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Next, with reference to the accompanying drawings, embodiments of the present invention will be described in detail.

Structure of First Embodiment

Figure 1:
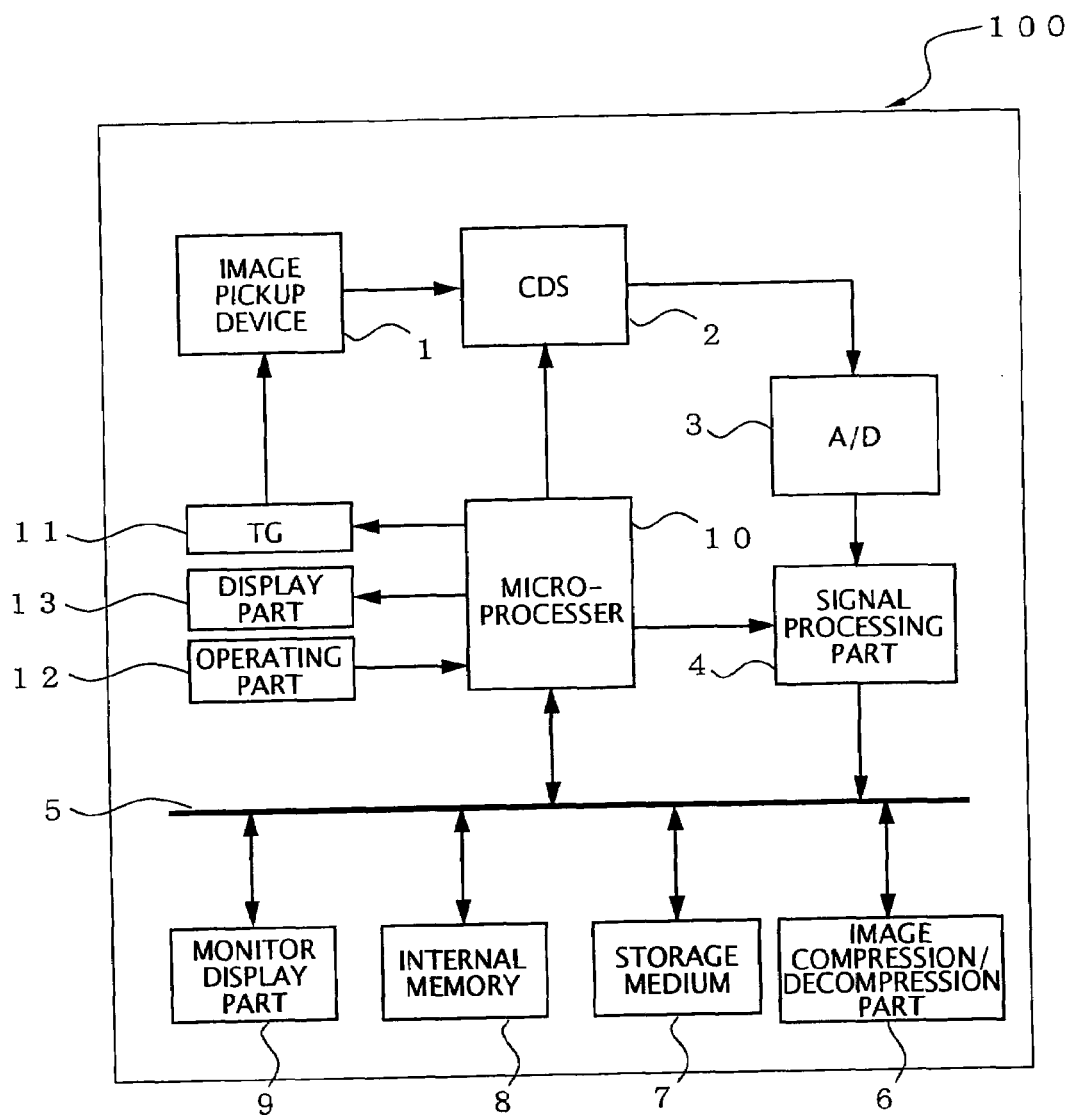
FIG. 1 is a schematic diagram showing a structure of an electronic still camera according to a first embodiment of the present invention.

FIG. 1 is a schematic diagram showing a structure of an electronic still camera 100 according to a first embodiment of the present invention. An image pickup device 1 is disposed on an image space of a shooting lens (not shown). Light receiving elements are two-dimensionally arranged on a light receiving plane of the image pickup device 1. An object image is projected on the light receiving plane of the image pickup device 1 and photoelectrically converted by the light receiving elements of the image pickup device 1, thereby generating image signals that compose image data.

An output of the image pickup device 1 is connected to a signal processing part 4 through a CDS circuit 2 and an A/D converting circuit 3. The signal processing part 4 performs an interpolation processing and so forth on image data. An output signal of the signal processing part 4 is connected to a bus 5.

An image compression/decompression part 6, a storage medium 7, an internal memory (buffer memory) 8, a monitor display part 9, and a microprocessor 10 are connected to the bus 5 so that signals are exchanged thereamong.

The image compression/decompression part 6 performs JPEG compression/decompression on image data on which a signal processing has been performed. The storage medium 7 is structured so that it is attachable to and detachable from the electronic still camera 100. The storage medium 7 is a known semiconductor memory such as a compact flash memory. The storage medium 7 stores image data compressed by the image compression/decompression part 6 in compliance with JPEG standard.

The internal memory 8 is composed of a continuous shooting memory area and a card access memory area. The continuous shooting memory area temporarily stores therein image data before compression so as to continue shooting operation smoothly without a break. On the other hand, the card access memory area temporarily stores therein image data that is to be stored in the storage medium. These areas of the internal memory 8 may be composed of independent memory devices or a single memory device.

The microprocessor 10 controls operations of respective parts of the electronic still camera 100. The microprocessor 10 is connected with a timing generator (TG) 11 that generates pulses and so forth for driving the image pickup device 1, an operating part 12 composed of, for example, a release button and a command dial, a display part 13 that displays a storable continuous frame count, a continuous shooting rate of frames (fps) of when an actual continuous frame count exceeds storable continuous frame count, and so forth, so that signals are exchanged thereamong.

The microprocessor 10 holds information on a processing rate of each part of the electronic still camera 100 (a signal reading rate from the image pickup device 1, a data write rate of the internal memory 8, an image compression rate, and so forth) and information on a storage capacity of the internal memory 8.

The microprocessor 10 obtains information on a continuous shooting rate of frames and a shooting mode (an exposure condition, an image data amount per frame in a continuous shooting) from the operating part 12. In addition, the microprocessor 10 sends and receives data to and from the storage medium 7, and performs a configuration check thereof to read a storing rate and a residual storage capacity of the storage medium 7 at least when the electronic still camera 100 is powered on or when the storage medium 7 is attached thereto.

Moreover, the microprocessor 10 calculates the storable continuous frame count and the continuous shooting rate of frames of when an actual continuous frame count exceeds the storable continuous frame count, in accordance with a result of comparison of the internal processing rate and the storing rate of the storage medium 7.

Operation of First Embodiment

Figure 2:
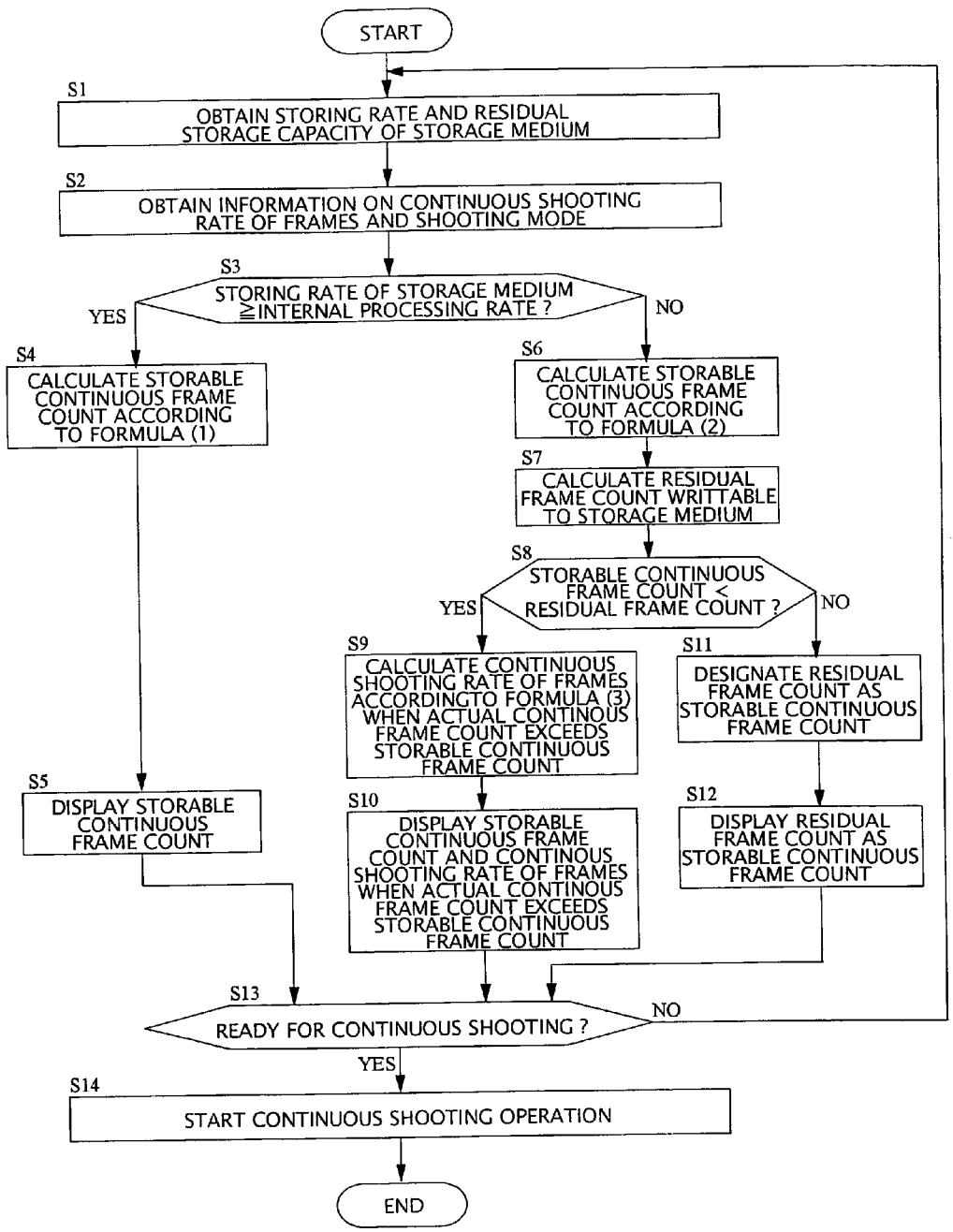
FIG. 2 is a flow chart showing an operation of the electronic still camera according to the first embodiment of the present invention.

The electronic still camera 100 according to the first embodiment is structured as described above. In order of step numbers shown in FIG. 2, the operation of the electronic still camera 100 according to the first embodiment will be described in the following.

Step S1: When the electronic still camera 100 is powered on or the storage medium 7 is attached thereto, the microprocessor 10 performs a data write operation and a data read operation to the storage medium 7 to acquire information on a storing rate and a residual storage capacity of the storage medium 7.

Step S2: The microprocessor 10 obtains information on a continuous shooting rate of frames and a shooting mode (an image data amount pre frame, an exposing condition, and so forth) that the user has set with the operating part 12.

Step S3: The microprocessor 10 determines whether or not the storing rate of the storage medium 7 is equal to or higher than the internal processing rate of the electronic still camera 100 by comparing an internal processing rate of the electronic still camera 100 pre-stored in the microprocessor 10 with the storing rate (obtained at step S1) of the storage medium 7. In the electronic still camera 100, the signal reading rate read from the image pickup device 1, the data write rate of the internal memory 8, and the image compression process rate are different from each other. The microprocessor 10 designates the slowest rate of these rates as the internal processing rate and compares the designated internal processing rate with the storing rate of the storage medium 7.

When the storing rate of the storage medium 7 is equal to or higher than the internal processing rate of the electronic still camera 100 (Yes at step S3), the flow advances to step S4. In contrast, when the storing rate of the storage medium 7 is lower than the internal processing rate of the electronic still camera 100 (No at step S3), the flow advances to step S6.

Step S4: In this case, since the storing rate of the storage medium 7 is higher than the internal processing rate of the electronic still camera 1, image data stored in the internal memory 8 is quickly written to the storage medium 7. Running-out of the residual storage capacity of the storage medium 7 makes the continuous shooting operation stop. Thus, the internal memory 8 cannot be filled with image data. In other words, the storable continuous frame count depends on the residual storage capacity of the storage medium 7. Specifically, the microprocessor 10 calculates the continuous shooting rate of frames corresponding to the storable continuous frame count and the image data amount according to the following formula (1):

Storable continuous frame count=residual storage capacity of storage medium/image data amount (1).

Note that at step S4 the microprocessor 10 does not calculate the continuous shooting rate of frames of when an actual continuous frame count exceeds the storable continuous frame count since the storable continuous frame count coincides with the residual storable frame count.

Step S5: The microprocessor 10 instructs the display part 13 to display the storable continuous frame count (obtained at step S4). Since the storable continuous frame count has to be an integer, the display part 13 displays the integer portion of the storable continuous frame count with the decimal portion truncated (only integer portion is displayed at steps S10 and S12 that will be described later). Thereafter, the flow advances to step S13.

Step S6: In this case, the storing rate of the storage medium 7 is lower than the internal processing rate of the electronic still camera 100. In other words, data input to the internal memory 8 is faster than data output thereto, so that the residual storage capacity of the internal memory 8 runs out, thereby stopping the continuous shooting operation. Accordingly, the storable continuous frame count depends on the image data amount storable in the internal memory 8.

Specifically, the microprocessor 10 calculates the storable continuous frame count corresponding to the continuous shooting rate of frames and to the image data amount by adding the maximum amount of image data storable in the internal memory 8 and the amount of image data writable to the storage medium 7 until the residual capacity of the internal memory 8 runs out.

Step S7: The microprocessor 10 calculates the residual frame count writable to the storage medium 7 by dividing the residual storage capacity of the storage medium 7 by the image data amount.

Step S8: The microprocessor 10 determines whether or not the storable continuous frame count (obtained at step S6) is lower than the residual storable frame count (obtained at step S7).

When the storable continuous frame count is lower than the residual storable frame count (Yes at step S8), the flow advances to step S9. In contrast, when the storable continuous frame count is equal to or higher than the residual storage frame count (No at step S8), the flow advances to step S11.

Step 9: When the storable continuous frame count is lower than the residual storage frame count, the microprocessor 10 calculates the continuous shooting rate of frames of when an actual continuous frame count exceeds the storable continuous frame count (obtained at step S6), according to the following formula (3):

$$\text{Continuous shooting rate of frames of when an actual continuous frame count exceeds storable continuous frame count} = \text{storing rate of storage medium}/\text{image data amount} \quad (3).$$

The continuous shooting rate of frames (fps) of when an actual continuous frame count exceeds the storable continuous frame count is proportional to a length of time taken for the residual capacity of the internal memory 8 to be equal to image data of one frame. Thus, the quotient of the storing rate of the storage medium 7 equivalent to the output rate of the internal memory 8 and the image data corresponds to the continuous shooting rate of frames of when an actual continuous frame count exceeds the storable continuous frame count.

Step S10: The microprocessor 10 instructs the display part 13 to display the storable continuous frame count (obtained at step S6) and the continuous shooting rate of frames of when an actual continuous frame count exceeds the storable continuous frame count (obtained at step S9). Thereafter, the flow advances to step S13.

Step S11: When the storable continuous frame count is higher than the residual storage frame count, the storable continuous frame count (obtained at step S6) is equal to or higher than the residual storable frame count (obtained at step S7). Therefore, it is not possible to continuously shoot frames over the residual storage frame count, so that the microprocessor 10 designates the residual frame count as the storable continuous frame count. In this case, the microprocessor 10 does not calculate the continuous shooting rate of frames of when an actual continuous frame count exceeds the storable continuous frame count.

Step S12: The microprocessor 10 instructs the display part 13 to display the residual frame count (obtained at step S7) as the storable continuous frame count. Thereafter, the flow advances to step S13.

At step S13: After giving the above-described instructions to the display part 13, the microprocessor 10 will be in a waiting state until the user starts the continuous shooting operation. The user checks the display on the display part 13 to see if the storable continuous frame count and so forth are sufficient. If so (Yes at step S13), the user starts the continuous shooting operation. At this point, the flow advances to step S14. On the other hand, when the user considers the storable continuous frame count as not sufficient (No at step S13), the user makes a setup operation once again from step S1. Specifically, the user increases the storable continuous frame count by replacing the storage medium 7 with a storage medium having a higher storing rate, decreasing the continuous shooting rate of frames, or decreasing the data amount per frame.

Step S14: The user presses the release button on the operating part 12 to start the continuous shooting. The microprocessor 10 instructs the timing generator 11 to drive the image pickup device 1 in response to the input to the release button. The image pickup device 1 performs photoelectric conversion on an image of an object in accordance with an exposure condition determined by the microprocessor 10.

An image signal read from the image pickup device 1 is temporarily stored in the memory area for continuous shooting of the internal memory 8 through the CDS circuit 2, the A/D converting circuit 3, and the signal processing part 4. Image signals are continuously stored in the continuous shooting memory area in response to successive shooting requests until the number of frames stored therein reaches the storable continuous frame count. On the other hand, while successively reading image data from the continuous shooting memory area, the image compression/decompression part 6 performs a two-dimensional image processing and a JPEG compression processing on the image data to successively generate image data for storage (namely, JPEG compressed files). The microprocessor 10 successively stores the generated image data in the card access memory area of the internal memory 8. In addition, the microprocessor 10 transfers a predetermined amount of image data from the card access memory area to the storage medium 7 at a timing when image data can be written to the storage medium 7. The foregoing series of operation completes the continuous shooting operation of the electronic still camera 100.

Effect of First Embodiment

As described above, according to the first embodiment of the present invention, in accordance with the storing rate of the storage medium, the storable continuous frame count and the continuous shooting rate of frames of when an actual continuous frame count exceeds the storable continuous frame count are calculated for display on the display part 13 of the electronic still camera 100. Thus, the user can accurately know the storable continuous frame count and so forth in the continuous shooting operation. The user can increase the storable continuous frame count and obtain a desired continuous shooting performance by replacing the storage medium 7 with a proper one or by re-setting the continuous shooting rate of frames and the data amount per one frame.

Second Embodiment

Figure 3:
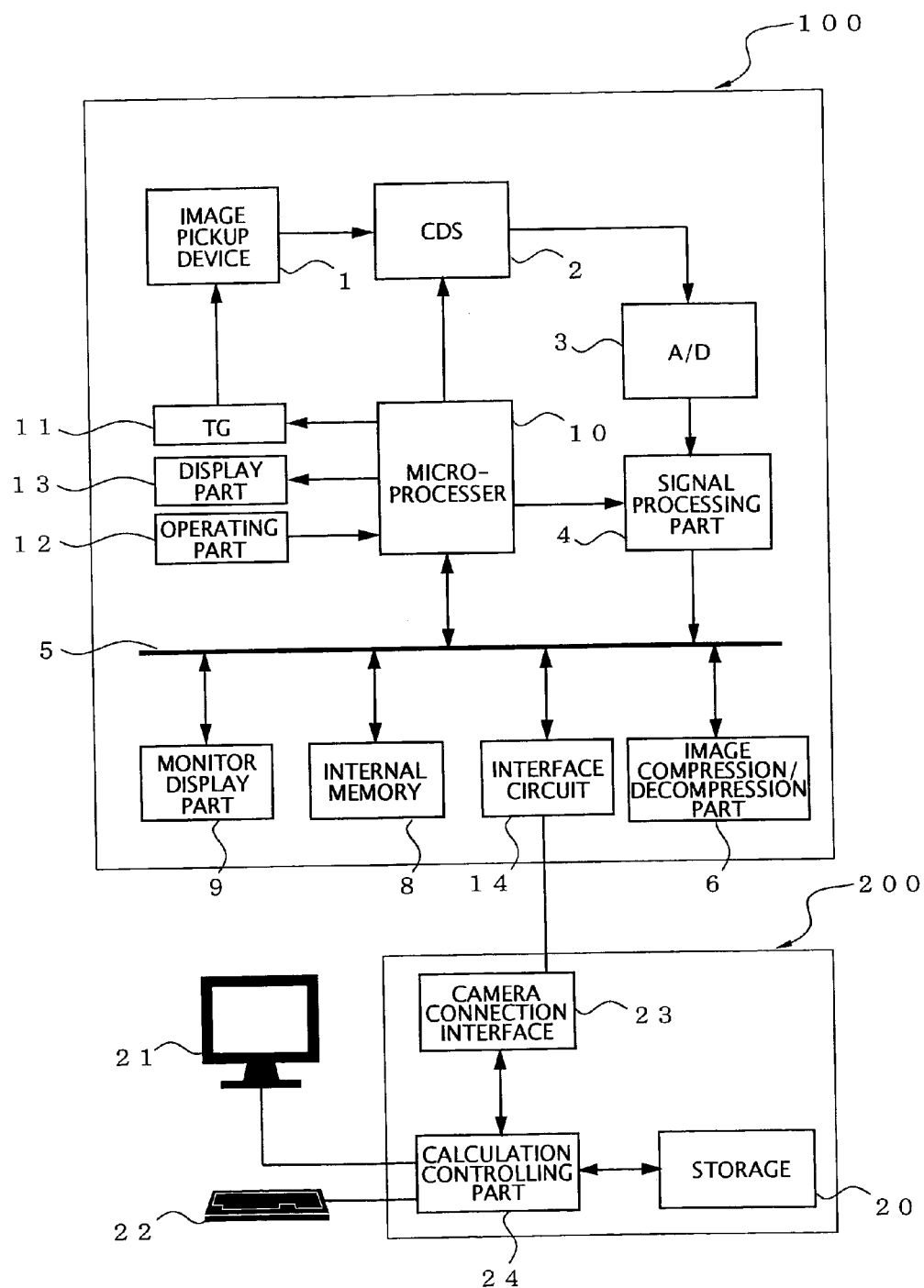
FIG. 3 is a schematic diagram showing a structure of an electronic still camera system according to a second embodiment of the present invention.

FIG. 3 is a schematic diagram showing a structure of an electronic still camera system according to a second embodiment of the present invention. For simplicity, the same parts herein as those in the first embodiment will be denoted by similar reference numerals and their description will be omitted.

In the electronic still camera system according to the second embodiment, an electronic still camera 100 is connected with an outboard storage 200 to store image data therein. The outboard storage 200 according to the second embodiment has a storage 20 that stores image data, a display part 21 such as a monitor, an input part 22, a camera connection interface 23, and a calculation controlling part 24 that controls each part of the outboard storage 200. The outboard storage 200 may be for example a storage that is directly connectable to the electronic still camera 100, a stand-alone type personal computer, or a network computer composed of a server and a client.

An interface circuit 14 is connected to a bus 5 of the electronic still camera 100 so that signals are exchanged therebetween. The interface circuit 14 adjusts levels of signals sent and received between the electronic still camera 100 and the outboard storage 200. The electronic still camera 100 is connected to the outboard storage 200 through the interface circuit 14. The connection between them are made by known communication means such as a universal serial bus (USB), an IEEE 1394 standard serial bus, a LAN cable, or a communication line (a public telephone line, a wireless circuit, or a cellular phone line) or, by combining these.

Data transfer rate between the electronic still camera 100 and the outboard storage 200 may fluctuate depending on a connection state of a peripheral device and so forth. Thus, in the second embodiment, the microprocessor 10 reads the data transfer rate when necessary in response to a variation in a communication environment between the electronic still camera 100 and the outboard storage 200.

Operation of Second Embodiment

Figure 4:
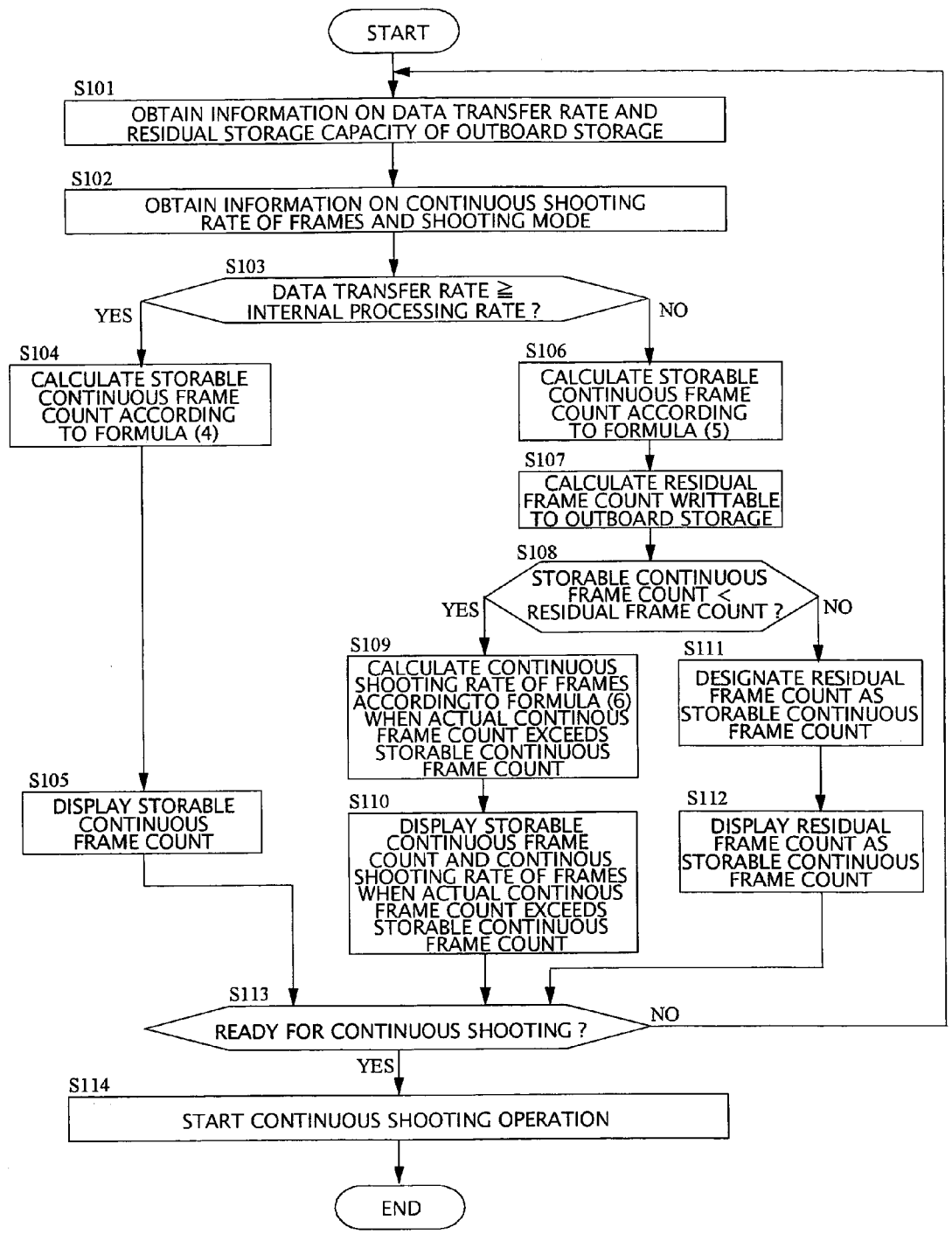
FIG. 4 is a flow chart showing an operation of an electronic still camera system according to the second embodiment of the present invention.

The electronic still camera system according to the second embodiment is structured as described above. In order of step numbers shown in FIG. 4, the operation of the electronic still camera system according to the second embodiment will be described. Steps S101 to S114 of the second embodiment correspond to steps S1 to S14, respectively.

At step S101: At the power-on of the electronic still camera 100 or the connection of the outboard storage 200 to the electronic still camera 100, the microprocessor 10 performs a data write operation and a data read operation to the outboard storage 200 and obtains information on a data transfer rate and a residual storage capacity of the outboard storage 200. When a variation occurs in the communication environment between the electronic still camera 100 and the outboard storage 200, the microprocessor 10 reads the data transfer rate.

Step S102: The microprocessor 10 obtains information on a continuous shooting rate of frames and a shooting mode that the user has set with an operating part 12.

Step S103: The microprocessor 10 compares an internal processing rate of the electronic still camera 100 and the data transfer rate (obtained at step S101) of the outboard storage 200 and determines whether or not the data transfer rate of the outboard storage 200 is equal to or higher than the internal processing rate of the electronic still camera 100.

When the data transfer rate is equal to or higher than the internal processing rate (Yes at step S103), the flow advances to step S104. In contrast, when the data transfer rate is lower than the internal processing rate (No at step S103), the flow advances to step S106.

Step S104: In this case, the microprocessor 10 calculates a storable continuous frame count corresponding to the designated continuous shooting rate of frames and to an image data amount according to the following formula (4):

Storable continuous frame count=residual storage capacity of outboard storage/image data amount (4).

Step S105: The microprocessor 10 instructs a display part 13 of the electronic still camera 100 to display the storable continuous frame count (obtained at step S104). Thereafter, the flow advances to step S113.

Step S106: In this case, the microprocessor 10 calculates a storable continuous frame count corresponding to the designated continuous shooting rate of frames and to an image data amount.

Step S107: The microprocessor 10 divides the residual storage capacity of the outboard storage 200 by the image data amount and obtains the quotient as the residual frame count that is writable to the outboard storage 200.

Step S108: The microprocessor 10 determines whether or not the storable continuous frame count (obtained at step S106) is lower than the residual storage frame count (obtained at step S107) that is writable to the outboard storage 200. When the storable continuous frame count is lower than the residual storage frame count (Yes at step S108), the flow advances to step S109. In contrast, when the storable continuous frame count is equal to or higher than the residual storage frame count (No at step S108), the flow advances to step S111.

Step S109: When the storable continuous frame count is lower than the residual storage frame count, the microprocessor 10 calculates the continuous shooting rate of frames of when an actual continuous frame count exceeds the storable continuous frame count (obtained at step S106) according to the following formula (6).

Continuous shooting rate of frames of when an actual continuous frame count exceeds storable continuous frame count=data transfer rate of outboard storage/image data amount (6)

Step S110: The microprocessor 10 causes the display part 13 of the electronic still camera to display the storable continuous frame count (obtained at step S106) and the continuous shooting rate of frames of when an actual continuous frame count exceeds the storable continuous frame count (obtained at step S109). Thereafter, the flow advances to step S113.

Step S111: When the storable continuous frame count is equal to or higher than the residual storage frame count, the microprocessor 10 designates the residual frame count as the storable continuous frame count.

Step S112: The microprocessor 10 instructs the display part 13 of the electronic still camera 100 to display the residual frame count (obtained at step S107) as the storable continuous frame count. Thereafter, the flow advances to step S113.

Step S113: After giving the above-described instructions to the display part 13, the microprocessor 10 will be in a waiting state until the user starts the continuous shooting operation. The user checks the display part 13 to see if the storable continuous frame count and so forth are sufficient. With sufficient storable continuous frame count and so forth (Yes at step S113), the user starts the continuous shooting operation. At this point, the flow advances to step S114. In contrast, when the user finds the storable continuous frame count and so forth insufficient (No at step S113), the flow returns to step S101.

Step S114: The user presses the release button of the operating part 12 of the electronic still camera 100 to start the continuous shooting operation.

Effect of Second Embodiment

According to the second embodiment, the storable continuous frame count and the continuous shooting rate of frames of when an actual continuous frame count exceeds the storable continuous frame count are calculated in accordance with the data transfer rate of the outboard storage 200 for display on the display part. Thus, similarly to the first embodiment, the electronic still camera system according to the second embodiment allows the user to accurately know the storable continuous frame count in the continuous shooting operation.

Additional Matters to Embodiments

Although the present invention has been described with respect to the above-described embodiments, the technical art thereof should be not limited thereto. For example, the foregoing embodiments may be configured to have an alarm display in order to allow the user to easily recognize a decrease in the continuous shooting rate of frames in a case where a current continuous frame count is over the storable continuous frame count during the continuous shooting.

For example, in a case where the electronic still camera continuously shoots the first to tenth frames at 5 fps, and the eleventh and subsequent frames at 3 fps, the camera may be configured to display the alarm on the finder when the release button is still pressed upon completion of shooting the tenth frame. The alarm that appears on the finder may be a lighting or blinking LED, an alarm sound, and information display blinking on the finder.

According to the foregoing embodiments, the capacities of the continuous shooting memory area and the card access memory area of the internal memory 8 are added, however, the capacities of respective areas of the internal memory 8 may be separately calculated.

Moreover, in the foregoing embodiments, the electronic still camera 100 may be configured to display the storable continuous frame count and so forth on the monitor display part 9. Alternatively, the user may be informed of the storable continuous frame count and so forth with sound.

In addition, in the second embodiment it may be configured to set the continuous shooting rate of frames and shooting mode of the camera, the shutter operation, and the display of the storable continuous frame count by the outboard storage 200 if the outboard storage 200 is a computer.

The invention is not limited to the above embodiments and various modifications may be made without departing from the spirit and scope of the invention. Any improvement may be made in part or all of the components.

What is claimed is:

1. An electronic still camera comprising an image pickup device, an internal memory, a calculating part, a storage medium, and a display part, the storage medium being attachable to the electronic still camera and storing therein image data obtained from the image pickup device through the internal memory, wherein:

the calculating part comprises: a storage information reading part reading a storing rate and a residual storage capacity of the storage medium; a comparison part comparing an internal processing rate of the electronic still camera and the storing rate of the storage medium; and a frame count calculating part calculating a storable continuous frame count and a continuous shooting rate of frames which is of when an actual continuous frame count exceeds the storable continuous frame count, the storable continuous frame count corresponding to a designated continuous shooting rate of frames and an image data amount;

when the storing rate is equal to or higher than the internal processing rate, the frame count calculating part calculates the storable continuous frame count in accordance with the residual storage capacity of the storage medium and the image data amount;

when the storing rate is lower than the internal processing rate, the frame count calculating part calculates the storable continuous frame count in accordance with the storage capacity of the internal memory, the image data amount, the continuous shooting rate of frames, the internal processing rate, and the storing rate, and calculates, in accordance with the storing rate and the image data amount, a continuous shooting rate of frames of when an actual continuous frame count exceeds the storable continuous frame count; and the display part displays at least one of the storable continuous frame count and the continuous shooting rate of frames of when an actual continuous frame count exceeds the storable continuous frame count.

2. The electronic still camera as set forth in claim 1, wherein when the storing rate is lower than the internal processing rate, the frame count calculating part calculates the continuous shooting rate of frames of when an actual continuous frame count exceeds the storable continuous frame count, according to a following formula (3):

Continuous shooting rate of frames of when an actual continuous frame count exceeds storable continuous frame count=storing rate of storage medium/ image data amount (3).

3. The electronic still camera as set forth in claim 2, wherein the storage information reading part reads the storing rate at least when the electronic still camera is provided on or when the storage medium is attached to the electronic still camera.

4. The electronic still camera as set forth in claim 1, wherein the storage information reading part reads the storing rate at least when the electronic still camera is powered on or when the storage medium is attached to the electronic still camera.

5. An electronic still camera comprising an image pickup device, a calculating part, a storage medium, an internal memory and a display part, the storage medium being attachable to the electronic still camera and storing therein image data obtained from the image pickup device, wherein:

the calculating part comprises: a storage information reading part reading a storing rate and a residual storage capacity of the storage medium; a comparison part comparing an internal processing rate of the electronic still camera and the storing rate of the storage medium; and a frame count calculating part calculating a storable continuous frame count by dividing the residual storage capacity by an image data amount per frame when the storing rate is equal to or higher than the internal processing rate and calculating the storable continuous frame count in accordance with a storage capacity of the internal memory when the storing rate of the storage medium is lower than the internal processing rate; and the display part displays the storable continuous frame count.

6. An electronic still camera, comprising:

an image pickup device;

an internal memory temporarily storing therein an image generated by the image pickup device;

a storage medium storing therein image data obtained by signal-processing the image;

a calculating part obtaining a maximum number of images storable in the internal memory, and an amount of image data storable in the storage medium until a number of images stored in the internal memory reaches the maximum number, and adding the maximum number of images and the amount of image data so as to calculate a storable continuous frame count; and a display part displaying the storable continuous frame count.

* * * * *